United States Patent Office 2,732,345
Patented Jan. 24, 1956

2,732,345
SOLUBLE OILS

Walter Kroenig and Walter Hinsch, Hamburg, Germany, and Martinus J. van der Zijden and Willem Frederik Jense, Amsterdam, Netherlands, assignors to Shell Development Company, Emeryville, Calif., a corporation of Delaware No Drawing. Application March 13, 1952,
Serial No. 276,448

Claims priority, application Germany March 17, 1951

12 Claims. (Cl. 252—33.4)

This invention relates to improved and novel rust and corrosion preventive compositions, said compositions being applicable as metal working lubricants, as anti-corrosive compositions in water systems, as for example in automobile radiators, water pressure circuits and the like. More particularly, this invention pertains to soluble oil compositions and to oil-in-water emulsions preparable therefrom and possessing improved rust and corrosion inhibiting properties which are particularly applicable as cutting fluids.

In general, emulsions or soluble oils are preferred to oil or waterbase fluids in the metal working art such as in drilling, milling, drawing, cutting, grinding and the like because better and greater production can be attained.

Soluble oils are generally prepared by incorporating into an oil-in-water mixture a suitable emulsifying agent such as a soap; they can be further improved by addition thereto of anti-foam agents, rust inhibitors and the like. Generally, other than the emulsifying agent, which can be considered as being amphipathic in character, the corrosion inhibiting agents such as nitrite and the like are water-soluble and therefore remain in the water or continuous phase of the emulsion.

The art discloses various means of solubilizing water-soluble corrosion inhibitors in the oil phase, such as described in United States Patent 2,455,659. In this patent, the nitrite is modified by using it as a component in the formation of a complex with a petroleum sulfonate resulting in reality in a new material, thereby altering the effectiveness of the nitrite per se.

It has now been discovered that more efficient compositions possessing superior corrosion and rust inhibiting properties are produced when oil-insoluble corrosion improving agents, such as oil-insoluble inorganic nitrite corrosion inhibitors are maintained in the oil phase without any modification in their chemical structure. In accordance with this invention, this can be accomplished by means of particular aliphatic solutizers containing one alcoholic (carbinol) functional group and one and only one other functional group, which latter group is a neutral oxygen-containing group and is either an alcoholic (carbinol) or a ketonic (carbonyl) group, the substance containing only C, H and O and from 4 to 10 carbon atoms, preferably 6 to 8 carbon atoms per molecule.

Specifically, it has now been discovered that by the use of solutizers as defined above, a one-phase stable oil system can be formed containing therein an oil-insoluble corrosion inhibitor such as water-soluble inorganic nitrites and an amphipathic emulsifier, which one-phase system is completely dispersible in water and resulting in a stable oil-in-water emulsion.

The water-soluble corrosion inhibitors desirable for use in emulsion of this invention can be inorganic or organic nitrites, chromates, phosphates, borates, exemplified by metal and/or organic nitrogen base nitrites such as Na, Li, K, Ca, Ba nitrites, ammonium nitrite, dicyclohexylammonium nitrite, dicycloisopropylammonium nitrite or the corresponding chromates, phosphates, borates and the like.

The solutizers for the corrosion inhibitors are exemplified by octanediols such as octane 1,8 diol, 2-ethyl-hexane-1,3-diol and 2,5 dimethyl hexane 2,5 diol, hexanediols such as hexane-1,6-diol, 2-methylpentane-2,4-diol, hexane 1,5 diol, 2-methylpentane-2,5-diol, 3-methylpentane-2,5-diol, hexane-1,4-diol, hexane-2,5-diol, pentane-2,4-diol, butane-1,4-diol, 1-butene 3,4 diol, nonane 1,9 diol, decane 1,10 diol, or by diacetonyl alcohol acetol, dimethylketol, diethylketol, and the like. The amount of solutizer which is generally required for the purpose of this invention can vary from less than 1% to 10% by weight depending upon the amount of corrosion inhibitor (nitrite) which is to be solubilized in the oil phase. In general the weight ratio of the oil-insoluble corrosion inhibitor (nitrite) to the solutizer should be between the limits of 1:1 and 1:2 respectively.

The emulsifying agents can be of various kinds provided they are amphipathic in character. An amphipathic substance is one which has an affinity for two different materials (oil and water) or phases. Among such materials can be included metal and/or non-metallic soaps such as soaps of fatty acids, tall oil acids, resin acids, naphthenic acids, sulfonic acids, fish oil acids and mixtures thereof, as well as soaps derived from glycerides; non-ionic emulsifiers such as the "Spans and Tweens" (Atlas Powder Co.) or the "Pluronics" (Wyandotte Chemical Co.). Specific examples of suitable emulsifiers for compositions of this invention are: the alkali metals, e. g., sodium, potassium or amine salts of petroleum sulfonic acid, oleic acid, stearic acid, naphthenic acid, resin acids, tall oil acids, and mixtures thereof. The non-ionic emulsifiers can be illustrated by polyethylene glycol oleate and ricinoleate, sorbitan monooleate and the like. Mixtures of ionic and non-ionic emulsifiers can also be used such as sodium petroleum sulfonate and sorbitan monooleate. The emulsifier can be used in amounts ranging from 5 to 40% by weight, based on the total mixture. In addition the solutizers of this invention possess an added advantage by greatly reducing the increased viscosity of oils which are produced by the emulsifying agents such as soaps and the like.

If desired, and this is a preferred embodiment of this invention, the emulsifiers such as a sodium petroleum sulfonate can be made in situ in a suitable oil base such as a naphthenic spindle oil and a nitrite or other corrosion inhibitor and a suitable solutizer such as an alkanediol added thereto in desired amounts.

The above three essential oil additives, namely the corrosion inhibitor such as a nitrite, solutizer and emulsifier form with the oil a one-phase oil system. The one-phase oil system can be also defined as a substantially water-free solubilizing oil containing the corrosion inhibitor solutizer and emulsifier as defined. When this one-phase oil system or soluble oil is dispersed in water, the final composition is defined as an emulsion in which the soluble oil or one-phase oil system is the discontinuous phase, while water is the continuous phase. Other agents can be added either to the oil phase or to the water phase so as to form a more improved final oil-in-water emulsion wherein the oil-insoluble corrosion inhibitor (nitrite) is kept in the oil phase. Such materials are generally used in amounts of from 0.1% to 5% and include stabilizers such as the glycol mono alkyl ethers, e. g., Carbon and Carbide Chemical Corp. "Carbitols" and "Cellosolves" such as ethylene glycol mono ethyl ether, ethylene glycol mono propyl ether, ethylene glycol mono n-butyl ether, ethylene glycol mono-isobutyl ether, ethyleneglycol mono-tert-butyl ether, ethylene glycol mono-hexyl-butyl ether, propylene glycol mono-isoamyl ether, dipropylene glycol, etc. Also glycerine and the like may be used, as well as alkylol amines such as mono, di and triethanol amines, dimethyl-ethanol amines, diethylethanol amine, and isopropanol amine.

The base oil may be a natural or synthetic oil, such as a hydrocarbon oil of wide viscosity range or a blend of hydrocarbon oils with fixed oils such as castor oil, lard oil and the oil and/or with synthetic lubricants such as polymerized olefins and the like. Preferred base oils are light mineral oils such as spindle oil, light mineral lubricating oils and the like.

The invention will be illustrated by means of the following examples:

*Example I*

After removing the acid tar formed from the acidic oil obtained by treating a naphthenic spindle oil with 15% by weight of oleum, and after having removed the sulfur dioxide formed by means of a current of air, the oil-soluble sulfonic acids were extracted with an alcoholic-aqueous caustic soda solution. The alcoholic-aqueous caustic soda solution used was a solution of 6 parts by weight of sodium hydroxide in 100 parts by weight of 50% ethanol. From the extract thus obtained the alcohol and a part of the water was distilled off leaving a crude sodium sulfonate sludge.

30 parts by weight of this crude sulfonate sludge, which contained 38% by weight of water and 40% by weight of petroleum sulfonates (calculated as pure sulfonates), were mixed at 40° C. with 70 parts by weight of a paraffinic spindle oil having a viscosity of $E_{20}=2.4$ and a density of $d_{20}=0.885$.

To this mixture which was placed in a lead-coated agitator 8 parts by weight of 96% sulfuric acid were slowly added under vigorous agitation by passing through air, whereby the temperature rose to 55° C. After the mixture had been thoroughly mixed for one hour and left to settle for eight hours, the lower aqueous layer, which contained sulfuric acid and sodium bisulfate in solution, was drawn off.

5 parts by weight of 96% sulfuric acid were now added to the supernatant acidic oil while it was being vigorously agitated by passing through air. After the mixture had been thoroughly mixed and had settled, the aqueous layer formed was again drawn off. After the aqueous layer and the small amount of dark grey sludge at the interface of the layer had been completely drawn off, the clear acidic oil was blown with air until all the sulfurous acid had been expelled. The neutralization number (mg. KOH consumption/gr substance) of the acidic oil was 20.

To 86 parts by weight of this acidic oil, 14 parts by weight of a clear mixture, consisting of 10 parts by weight of tall oil distillate (neutralization number 150) and 4 parts by weight of the spindle oil referred to above, were added while agitating vigorously by passing through air. The clear solution obtained, which had a neutralization number of 32, was neutralized while being vigorously mixed at 50° C. in such a manner that first by means of a 50% caustic potash solution the neutralization number was reduced to 1/3 of its original value and then complete neutralization was effected by means of a 45% caustic soda solution. Immediately after the addition of the final quantity of caustic solution, 3% by weight, based on the neutral oil, of 2-ethyl hexane-1,3-diol was added. After neutralization was completely finished, the neutral oil had a neutralization number (alkaline) of 0.5. The tall oil-spindle oil mixture referred to above was then added in an amount such that the neutralization number was adjusted to 0.8 acid. 0.25 parts by weight of ozokerite, which had been dissolved hot in 2.5 parts by weight of the afore-mentioned spindle oil, were then added.

After the oil had been cooled to 40° C., 2% by weight of sodium nitrite, based on the neutral oil, which had been dissolved in double the quantity by weight of water, was added. After being mixed thoroughly for half an hour the oil was clear and ready for use.

The oil obtained was easily emulsifiable in water and the emulsion was resistant to hard water. The oil was suitable as a cutting oil and afforded particularly good protection against corrosion in the working of cast iron.

*Example II*

50 parts by weight of a crude sulfonate sludge, obtained in a manner similar to that indicated in Example I, which contained 37% by weight of water and 45% by weight of petroleum sulfonates (calculated as pure sulfonates), were mixed with 50 parts by weight of the spindle oil used in Example I. This mixture was then treated with sulfuric acid in the way indicated in Example I, 13 parts by weight of sulfuric acid being used in the first and 9 parts by weight in the second treatment. The temperature rose to 65° C. The acidic oil freed of $SO_2$ had a neutralization number of 35.

66 parts by weight of this acidic oil were neutralized with a 45% caustic soda solution to a neutralization number (alkaline) of about 0.5. Immediately afterwards 2.5 parts by weight of 2-ethylhexane-1,3-diol were added and thoroughly mixed. While mixing was continued, 34 parts by weight of a solution of 75% by weight of tall oil distillate and 25% by weight of the spindle oil used in Example I were added. The tall oil distillate, which showed a neutralization number of 150, had approximately the following composition:

40% by weight of resinic acids
15% by weight of unsaponifiable substances
45% by weight of fatty acids.

The mixture was then neutralized with a 50% caustic potash solution to the neutralization number (alkaline) of 0.5. 2.5 parts by weight of 2-ethylhexane-1,3-diol were then added and sufficient of the above tall oil solution so as to adjust the neutralization number (acid) to about 1.5. 0.2 parts by weight of a slack wax, which had been obtained by dewaxing a cylinder oil fraction from Iraq crude oil, were now added. Finally, a solution of 5 parts by weight of sodium nitrite in 10 parts by weight of water was added together with 1.5 parts by weight of 2-ethyl-hexane-1,3-diol.

The clear oil obtained formed a completely transparent solution with soft water (condensed water, distilled water, rain water, softened water) and was particularly suitable as a cutting oil; the more so as it afforded a very high degree of protection against rust.

It was also possible to obtain water-soluble oils with equally good properties when 2-methylpentane-2,4-diol was used instead of the aforementioned 2-ethylhexane-1,3-diol.

*Example III*

100 parts by weight of a crude sulfonate sludge obtained in the manner indicated in Example I, but which had been dehydrated until the water content was 8% by weight, were mixed intimately with 300 parts by weight of 85% alcohol at a temperature of from 50 to 60° C. After subsequent cooling, filtration was carried out at 20° C. The alcohol was distilled off from the filtrate, a purified sulfonate of the following composition being obtained: 85% by weight of pure sulfonate, 6% by weight of water, 9% by weight of mineral oil.

12 parts by weight of this purified sulfonate were dissolved in 78 parts by weight of a naphthenic spindle oil having a viscosity of $E_{20}=4$. 10 parts by weight of the tall oil distillate described in Example II were then added. The solution was subsequently neutralized with 4.3 parts by weight of a 34% caustic potash solution at a temperature of from 50 to 60° C. Immediately afterwards 3.0 parts by weight of 2-ethylhexane-1,3-diol were added. But in this case neutralization was incomplete. The mixture had a neutralization number (acid) of 0.8.

A solution of 2.0 parts by weight of sodium nitrite in 4.0 parts by weight of water was now added to this mixture at a temperature of from 40 to 50° C.

In this way a good emulsifying oil with good anti-corrosive properties was obtained.

The following compositions were tested for their stability and corrosion inhibiting properties and the results are tabulated below, and are self-explanatory. The stability test consisted essentially in noting the degree of phase separation on allowing test samples to stand at room temperature. The corrosion test comprised immersing metal plates into a beaker to test emulsion and thereafter removing the plate and subjecting it to exposure for 24 hours and noting the degree of corrosion thereafter.

| Compositions | Stability | | Corrosion | |
|---|---|---|---|---|
| | Soft Water | Hard Water | Soft Water | Hard Water |
| Example I | Excellent | Excellent | None | None. |
| Example II | do | do | do | Do. |
| Example III | do | do | do | Do. |
| Composition A[1] | Fair | Poor | Poor | Poor. |

[1] Composition A was prepared essentially in the same manner as Example I, except that the 2-ethylhexane-1,3-diol was omitted and the sodium nitrite was added to the water phase.

Compositions of this invention can be applied with excellent results to general cutting operations where cooling and lubricating of the tool and work piece under adverse conditions are encountered. Metals machined with the aid of fluids of this invention have good surface finish, are free from rust and stain, and the tool life is excellent.

We claim as our invention:

1. A one-phase soluble oil composition comprising a major amount of a mineral oil, a minor but effective corrosion inhibiting amount up to 10% of an oil-insoluble nitrite, from about 1% to about 10% of a solutizer for the oil-insoluble nitrite, said solutizer being selected from the class of aliphatic diols and aliphatic ketols having from 4 to 10 carbon atoms and from 5% to 40% of an organic emulsifying agent having amphipathic properties and which forms oil-in-water emulsions.

2. A one-phase oil-soluble composition comprising a major amount of a mineral oil, a minor but effective corrosion inhibiting amount up to 10% of an oil-insoluble nitrite, from 1% to 10% of a dihydric aliphatic alcohol containing from 4 to 10 carbon atoms in the molecule and from 5% to 40% of an organic emulsifying agent having amphipathic properties and which forms oil-in-water emulsions.

3. A one-phase oil-soluble composition comprising a major amount of a mineral oil, a minor but effective corrosion inhibiting amount up to 10% of an oil-insoluble nitrite, from 1% to 10% of an aliphatic compound of from 4 to 10 carbon atoms in the molecule, said compound consisting of carbon, hydrogen, and oxygen, and containing only one alcoholic hydroxy group and only one carbonyl group, and from 5% to 40% of an organic emulsifying agent having amphipathic properties and which forms oil-in-water emulsions.

4. A one-phase oil-soluble composition comprising a major amount of a mineral oil, from 5% to 40% of an alkali metal soap, a minor but effective corrosion inhibiting amount up to 10% of an alkali metal nitrite and from 1% to 10% of an aliphatic diol containing from 4 to 10 carbon atoms in the molecule, said nitrite and diol being present in the ratio of 1:1 to 1:2, respectively.

5. A one-phase oil-soluble composition comprising a major amount of a mineral oil, from 5% to 40% of an alkali metal petroleum sulfonate, a minor but effective corrosion inhibiting amount up to 10% of an alkali metal nitrite and from 1% to 10% of an aliphatic diol containing from 4 to 10 carbon atoms in the molecule, said nitrite and diol being present in the ratio of 1:1 to 1:2, respectively.

6. A one-phase oil-soluble composition comprising a major amount of a mineral oil, from 5% to 40% of an alkali metal salt of tall oil, a minor but effective corrosion inhibiting amount up to 10% of an alkali metal nitrite and from 1% to 10% of an aliphatic diol containing from 4 to 10 carbon atoms in the molecule, said nitrite and diol being present in the ratio of 1:1 to 1:2, respectively.

7. A one-phase oil-soluble composition comprising a major amount of a mineral oil, from 5% to 40% of a sodium petroleum sulfonate, a minor but effective corrosion inhibiting amount up to 10% of an alkali metal nitrite and from 1% to 10% of an aliphatic diol containing from 4 to 10 carbon atoms in the molecule, said nitrite and diol being present in the ratio of 1:1 to 1:2, respectively.

8. A one-phase oil-soluble composition comprising a major amount of a mineral oil, from 5 to 40% of an alkali metal soap, a minor but effective corrosion inhibiting amount up to 10% of an alkali metal nitrite and from 1 to 10% of an aliphatic diol selected from the class consisting of 2-methyl pentane-2,4-diol and 2-ethylhexane-1,3-diol, said nitrite and diol being present in the ratio of 1:1 to 1:2 respectively.

9. A one-phase oil-soluble composition comprising a major amount of a mineral oil, from 5 to 40% of a sodium petroleum sulfonate, a minor but effective corrosion inhibiting amount up to 10% of an alkali metal nitrite and from 1% to 10% of 2-methyl pentane-2,4-diol said nitrite and diol being present in the ratio of 1:1 to 1:2, respectively.

10. A one-phase oil-soluble composition comprising a major amount of a mineral oil, from 5 to 40% of a sodium petroleum sulfonate, a minor but effective corrosion inhibiting amount up to 10% of an alkali metal nitrite and from 1 to 10% of 2-ethyl hexane-1,3-diol said nitrite and diol being present in the ratio of 1:1 to 1:2, respectively.

11. A one-phase oil-soluble composition comprising a major amount of a mineral oil, from 5 to 40% of a sodium petroleum sulfonate, a minor but effective corrosion inhibiting amount up to 10% of sodium nitrite and from 1 to 10% of 2-methyl pentane-2,4-diol said nitrite and diol being present in the ratio of 1:1 to 1:2, respectively.

12. A one-phase oil-soluble composition comprising a major amount of a mineral oil, from 5 to 40% of a sodium petroleum sulfonate, a minor but effective corrosion inhibiting amount up to 10% of sodium nitrite and from 1 to 10% of 2-ethyl hexane-1,3-diol said nitrite and diol being present in the ratio of 1:1 to 1:2, respectively.

References Cited in the file of this patent

UNITED STATES PATENTS

| 2,338,522 | Liberthson | Jan. 4, 1944 |
| 2,455,659 | Duncan et al. | Dec. 7, 1948 |
| 2,469,285 | White | May 3, 1949 |